UNITED STATES PATENT OFFICE.

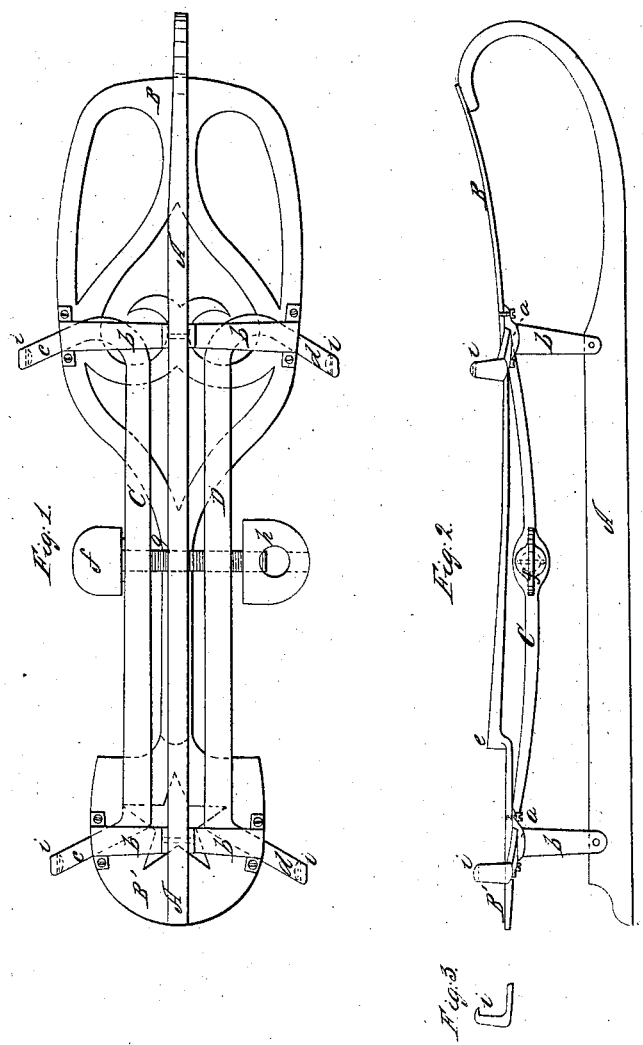

THOMAS VAN WAGONER, OF NEWARK, NEW JERSEY.

IMPROVEMENT IN SKATES.

Specification forming part of Letters Patent No. 46,836, dated March 14, 1865.

*To all whom it may concern:*

Be it known that I, THOMAS VAN WAGONER, of Newark, in the county of Essex and State of New Jersey, have invented a new and useful Improvement in Skates; and I do hereby declare that the following is a full, clear, and exact description thereof, which will enable those skilled in the art to make and use the same, reference being had to the accompanying drawings, forming part of this specification, in which—

Figure 1 is an under side view of a skate made according to my invention. Fig. 2 is a side elevation thereof. Fig. 3 is a detail of the chisel-edge of one of the clamps.

Similar letters of reference indicate corresponding parts.

This invention consists in an improvement in that class of skates which are secured to the feet of the skater by means of clamps that take hold of the soles and heels of the boots along their edges, the clamps and the device for operating them being greatly simplified by my invention.

A is the runner of the skate, and B the bed to which it is attached, and which receives the foot of the skater. The bed B sinks, as at B′, to receive the heel of the boot, forming a shoulder, e, across the bed, against which the inner edge of the heel rests as against a stop. The runner of the skate is connected to the bed by means of brackets b, four in number in this example, and which are placed so that two of them are opposite to each other on opposite sides of the heel of the skate and of the ball, respectively. The brackets are secured to the runner and to the under side of the bed by means of screws, and their faces where they are joined to the bed are cut down, so as to form slots a, where they join the bed. C and D are clamps of like shape, each having arms c c d d at their ends extending backward and outward at the same angle, and passing through the slots a, beyond which they are turned up at a right angle, as shown in Figs. 2 and 3. Their highest points are bent inward, as seen at i, and sharpened to a chisel-edge in order that they may take hold of the heel and sole, as aforesaid, when they are drawn against them by operating the screw f. f is a thumb-screw, which passes transversely through the sides of the clamps C D at a point about in the middle of their length, the clamp D being tapped with a screw-thread with which the threads of the screw f engage. g is a stop formed on the screw f at such a point as to come in contact with the inner face of the clamp C, so that the screw will be kept from moving forward in the clamp C, the screw being smooth from its head to the stop g, and the hole through the clamp C having smooth sides. h is a tightening-nut placed on the end of the screw, and which, when it is brought up against the outer face of the clamp D, prevents the backward rotation of the screw.

It is clear, from the above description that the clamp D acts as a nut to the screw f, the rotation of the latter to the right or the left causing the clamp D to travel backward or forward upon the screw, by which means the distance between the clamp is diminished or increased. Since the angular arms c c of the clamp C and d d of the clamp D are each free to move in their slots a, and since those arms which lie opposite to each other severally describe the same angle with the sides of the clamps, respectively, it follows that they will move equal distances through their slots in equal times, when the screw f is rotated, and the clamps will thereby be made to advance toward or recede from each other in like manner.

I claim as new and desire to secure by Letters Patent—

The combination of the screw g and nut h with the bars C D, arms c c d d, slots a a, and claws i i i i, constructed as described, and employed for securing the skate at the front and heel simultaneously, as explained.

THOMAS VAN WAGONER.

Witnesses:
WM. T. MCNAMARA,
C. L. TOPLIFF.